United States Patent [19]
Takeuchi et al.

[11] Patent Number: 5,497,227
[45] Date of Patent: Mar. 5, 1996

[54] SYSTEM FOR DETERMINING THE AUTHENTICITY OF AN OBJECT

[75] Inventors: Itsuo Takeuchi; Hidekazu Hoshino; Mutumi Sasaki, all of Kanagawa, Japan

[73] Assignee: NHK Spring Co., Ltd., Kanagawa, Japan

[21] Appl. No.: 549,610

[22] Filed: Aug. 16, 1993

[30] Foreign Application Priority Data

Sep. 29, 1992 [JP] Japan .................. 4-285270

[51] Int. Cl.⁶ .................. G06K 9/74; G06K 7/10; G03H 1/00
[52] U.S. Cl. .................. 356/71; 359/2; 235/457; 235/487
[58] Field of Search .................. 356/71; 359/2; 235/457, 487

[56] References Cited

U.S. PATENT DOCUMENTS

| | | | |
|---|---|---|---|
| 4,501,439 | 2/1985 | Antes | 356/71 |
| 4,568,141 | 2/1986 | Antes | 350/3.61 |
| 5,101,184 | 3/1992 | Antes | 235/454 |
| 5,200,794 | 4/1993 | Nishiguma et al. | 356/71 |
| 5,291,006 | 3/1994 | Nishiguma et al. | 235/454 |
| 5,300,764 | 4/1994 | Hoshino et al. | 356/71 |
| 5,347,111 | 9/1994 | Hoshino | 359/2 |

*Primary Examiner*—Frank Gonzalez
*Assistant Examiner*—Jason D. Eisenberg
*Attorney, Agent, or Firm*—Skjerven, Morrill, MacPherson, Franklin & Friel; Alan H. MacPherson; Omkar K. Suryadevara

[57] ABSTRACT

Provided is an identification system which is highly effective in identifying the authenticity of an object and extremely difficult to analyze for the purpose of forgery. The object to be identified is affixed with an identification element comprising a reflective layer including a hologram, a diffraction grating or the like, which directs incident light of a prescribed wave length into a plurality of point symmetric directions, and a polarization plane rotating layer which rotates the polarization plane of the light as it passes through the polarization rotating layer. A linearly polarized light is impinged upon the identification element, and is received by a multisegment photodiode arranged in an annular fashion. Those photodiode segments located on one side of a diametric line is covered by a first filter adapted to transmit substantially only the light emitted from the identification element whose plane of polarization is rotated by the polarization plane rotating layer while remaining segments are covered by a second filter adapted to transmit substantially only the light emitted from the identification element whose plane of polarization is not rotated by the polarization plane rotating layer. Thus, by detecting the ratios of the intensities of light received by each pair of diametrically opposing photodiode segments, the authenticity of the identification element or the authenticity of the object can be reliably detected.

7 Claims, 5 Drawing Sheets

SYSTEM FOR DETERMINING THE AUTHENTICITY OF AN OBJECT

The following co-pending patent applications are directed to subject matters similar to those of the present application, and are commonly assigned to NHK Spring Co., Ltd. The contents of these applications are hereby incorporated in the present application by reference.

| Application Number | Filing Date | Remarks |
|---|---|---|
| 07/547,936 | July 3, 1990 | abandoned |
| 07/782,976 | October 24, 1991 | CIP of 07/547,936 issued 04/06/93. |
| 07/788,569 | November 6, 1991 | CIP of 07/547,936 U.S. Pat. No. 5,291,006 issued 03/01/94 |
| 07/930,583 | August 14, 1992 | now abandoned |
| 07/998,067 | December 23, 1992 | issued 09/13/94. |
| 08/036,019 | March 23, 1993 | issued 08/01/95. |
| 08/036,016 | March 23, 1993 | issued 08/15/95. |

TECHNICAL FIELD

The present invention relates to a system for identifying an object suitable for determining the authenticity of the object.

BACKGROUND OF THE INVENTION

Conventionally, it has been proposed, for instance in Japanese utility model laid open (kokai) publication No. 61-182580, for the purpose of identifying or determining the authenticity of information storage cards (such as magnetic cards, various monetary papers, tickets and commercial goods) to affix an identification sticker including a hologram which is hard to forge, so that the authenticity may be visually determined.

Japanese patent laid open (kokai) publication No. 3-71383, filed by the same applicant, discloses a system for identifying an object by affixing an identification sticker which includes a hologram that contains a unique diffractive property, on the object to be identified, and radiating light upon this hologram so as to be diffracted by the hologram, and then receiving the diffracted light with an optical identification means.

In particular, according to the system using the optical identification means, as it is required for a potential forger to duplicate the diffractive property of the authentic hologram instead of the mere visual appearance, the forgery of the hologram is made highly difficult, making a reliable identification possible.

However, according to this system, it is clear to the user that the diffractive property of the hologram is providing the means for identification, and since it is not impossible to obtain the identification sticker itself (due to its nature) one cannot exclude the possibility of the hologram being forged in a highly accurate manner. Thus, there has been a demand for more reliable identification systems.

The inventors of the present application have conceived of the idea (for the purpose of more positively discouraging forgery) that it is possible to use, in combination with the reflective directivity (or diffraction property), a light source for emitting linearly polarized light, a polarization plane rotating means provided in the identification element for rotating the polarization plane by 90 degrees, by shifting the phase of the polarized light by 180 degrees, and light receiving means which is sensitive only to the portion of the light emitted from the identification element whose polarization plane has been rotated by 90 degrees; thus the authenticity of the object may be identified according to the state of polarization.

According to this idea, because the potential forger must duplicate not only the hologram or diffraction grating but also the polarization plane rotating means, any attempt to forge the identification element can be more effectively discouraged. However, because the intensity of the received light would not change significantly even when the amount of phase shift substantially deviated from 180 degrees, the intensity of the received light alone would not be sufficient for accurately detecting the phase shift of 180 degrees or the authenticity of the identification element. It is indeed possible to place a polarization plane rotating layer, in the form of a sticker or the like, on the identification element for the purpose of achieving the phase shift of approximately 180 degrees for deceptive purposes. In short, according to this idea, there is a possibility that an attempt to duplicate the rotation of the polarization plane by using a crude means may succeed.

It is therefore desired to provide more effective means for making the duplication of an identification element based on diffraction or reflective directivity more difficult, and thereby more effectively discouraging any attempt to forge the identification element.

BRIEF SUMMARY OF THE INVENTION

In view of such problems of the prior art, and such recognition by the inventors, a primary object of the present invention is to provide a system for identifying an object which provides an improved power of identification.

A second object of the present invention is to provide a system for identifying an object which is difficult to analyze or shows very little clue as to its working principle so that any attempt to forge it may be effectively discouraged.

A third object of the present invention is to provide a system for identifying an object which is difficult to forge through analysis of its structure.

A fourth object of the present invention is to provide a system for identifying an object which is difficult to forge but economical to fabricate.

According to the present invention, these and other objects can be accomplished by providing a system for identifying an object, comprising: an identification element comprising a reflective layer affixed to an object to be identified, the reflective layer having such a reflective directivity that when an incident light beam is impinged thereon the reflected light is directed at least in two directions which are 180 degrees apart around the incident light beam, and a polarization plane rotating layer placed on the reflective layer for rotating a polarization plane of light emitted from the reflective layer by 90 degrees relative to the incident light beam; light emitting means for producing the incident light beam as a linearly polarized light beam; light receiving means consisting of a plurality of pairs of light detecting segments arranged around the incident light beam 180 degrees apart; a first filter placed on one member of each pair of the light receiving segments, the first filter being adapted to transmit substantially only the light emitted from the identification element whose plane of polarization is rotated by the polarization plane rotating layer; a second filter placed on the other member of each pair of the light receiving segments, the second filter being adapted to transmit substantially only the light emitted from the identification element whose plane of polarization is not rotated by the polarization plane rotating layer; and determination means for comparing intensities of light detected by the light receiving segments, and determining the authenticity of the object according to a pattern of the intensities of light detected by the light receiving segments.

According to this system, the authenticity of the object is verified only when the light emitting means emits a light beam having a prescribed wavelength and polarization plane, the light receiving means in cooperation with the determination means detects the presence at the light receiving element of having light a distinctive diffractive property or a reflective directivity, and the light receiving element, with the aid of the first and second filters, again in cooperation with the determination means, detects the presence of a polarization plane rotating layer capable of rotating the polarization plane of by the light beam 90 degrees. Particularly because the presence of the polarization plane rotating layer is not visually discernible for practical purpose, a strong discouraging effect is produced on potential forgers. Further, even when the presence of the polarization rotating plane is detected by potential forgers, and an attempt is made to duplicate it by affixing a sheet having a double refractive property, because any substantial error in the angle by which the polarization plane is rotated by such a sheet is readily detected by the light receiving means, the difficulty involved in duplicating the identification element for an illicit purpose is extremely compounded.

Therefore, it becomes possible to positively and reliably identify the authenticity of an object even when it contains not only the hologram or a diffractive area, which has a specific diffractive property or a specific reflective directivity, but, also a polarization rotating layer in the form of, for instance, a sticker, which is affixed to the object for deceptive purposes.

Preferably, the determination means is provided with means for computing a ratio of the intensities of light received by each pair of the light receiving segments, and determining the authenticity of the object only when the ratio is greater than a prescribed threshold level only for a prescribed pair of the light receiving segments. Alternatively, it is possible to compute a difference in the intensities of light received by each pair of the diametrically opposing light receiving segments, and determine the authenticity of the object only when the difference is greater than a prescribed threshold level only for a prescribed pair of the light receiving segments.

BRIEF DESCRIPTION OF THE DRAWINGS

Now the present invention is described in the following with reference to the appended drawings, in which.

DETAILED DESCRIPTION OF THE PREFERRED EMBODIMENTS

Now the preferred embodiments of the present invention are described in the following with reference to the appended drawings.

Figure 1:
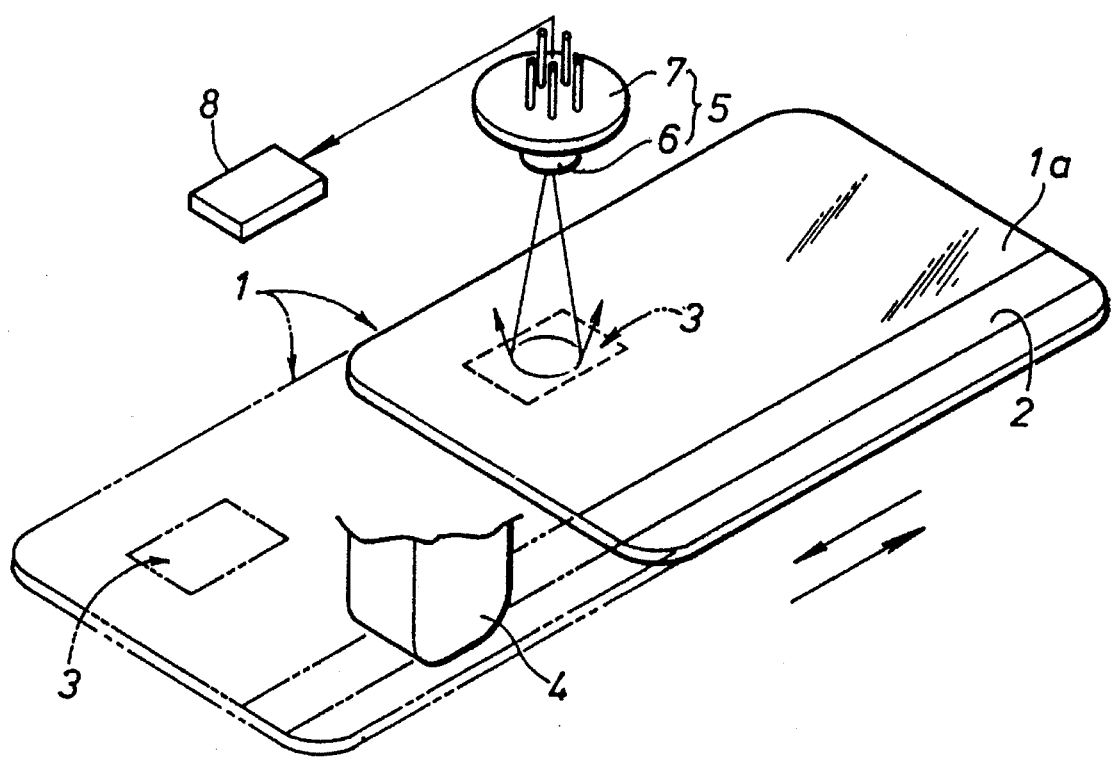
FIG. 1 is a perspective view showing an essential structure of a card and an identification system for identifying the authenticity of the card.

FIGS. 1 through 4 show an example of the present invention applied to a magnetic storage card. With reference to FIG. 1, a magnetic stripe 2 extends over a surface 1a of the card 1 along the lengthwise direction thereof. The surface 1a is further provided with an identification element 3 including a hologram layer having a specific diffractive property as described hereinafter.

Figure 2:
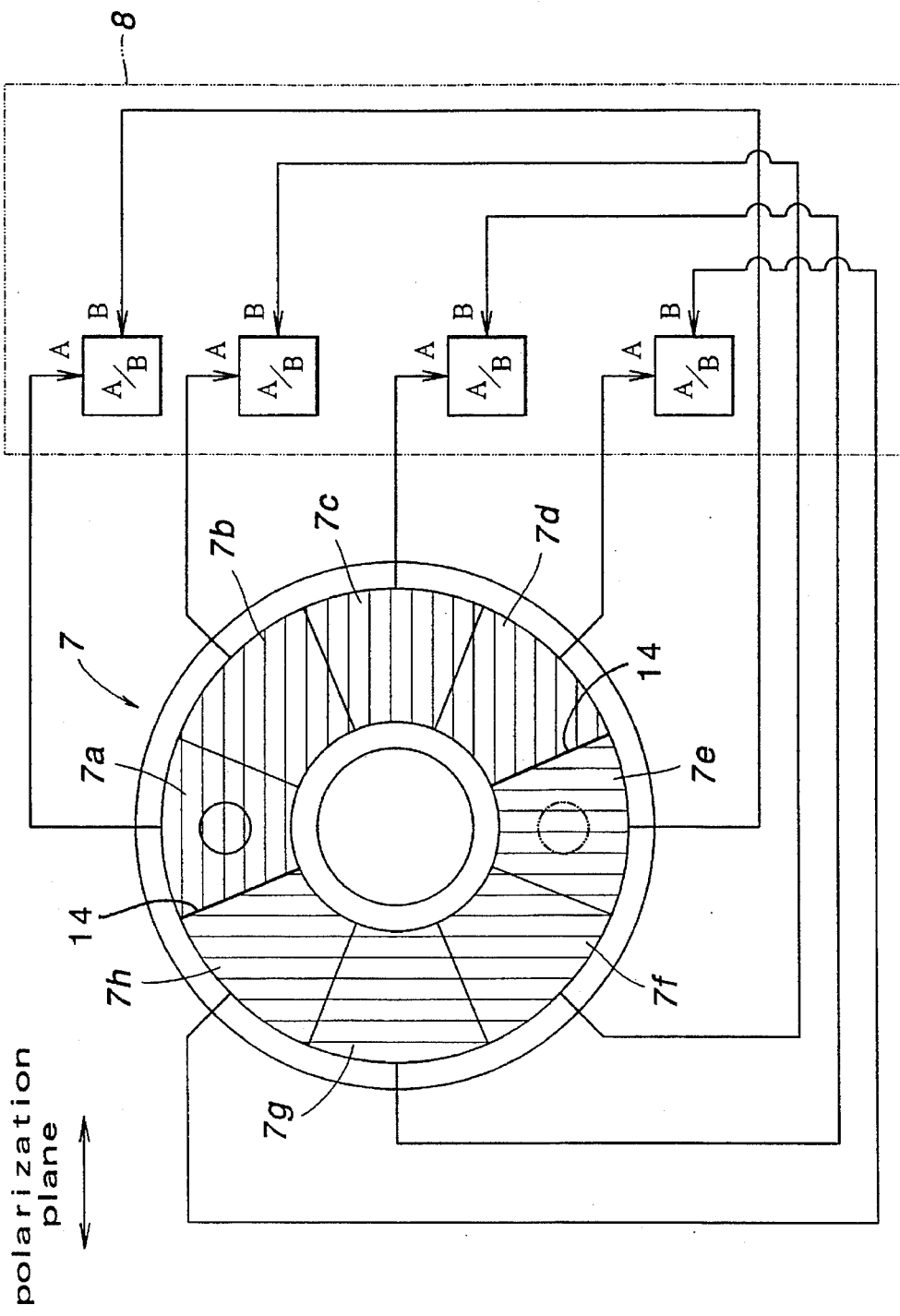
FIG. 2 is a plan view of the light emitting/receiving unit, and a block diagram of the determination unit.

A reader/writer for the card 1 is internally provided with a magnetic head 4 facing the magnetic stripe 2 when the card 1 is being conveyed by a conveying unit (not shown in the drawing) inside the reader/writer. Likewise, a light emitting/receiving unit 5 serving as optical identification means is provided in the card reader/writer so as to oppose the identification element 3 as the card 1 is conveyed. The light emitting/receiving unit 5 comprises a light emitting device 6 for impinging a laser light beam, consisting of a linearly polarized light of a specific wave length and a specific polarization direction and serving as detection light, upon the identification element 3 on the surface 1a of the card 1, and an annular light receiving device 7 surrounding the light emitting device 6 (FIG. 2). The light receiving device 7 comprises a multi-segment photodiode which is separated into eight segments 7a through 7h, each capable of individually detecting light. This light receiving device 7 is connected to a determination unit 8 comprising a CPU, memory, and I/F for determining the authenticity of the card 1.

Figure 3:
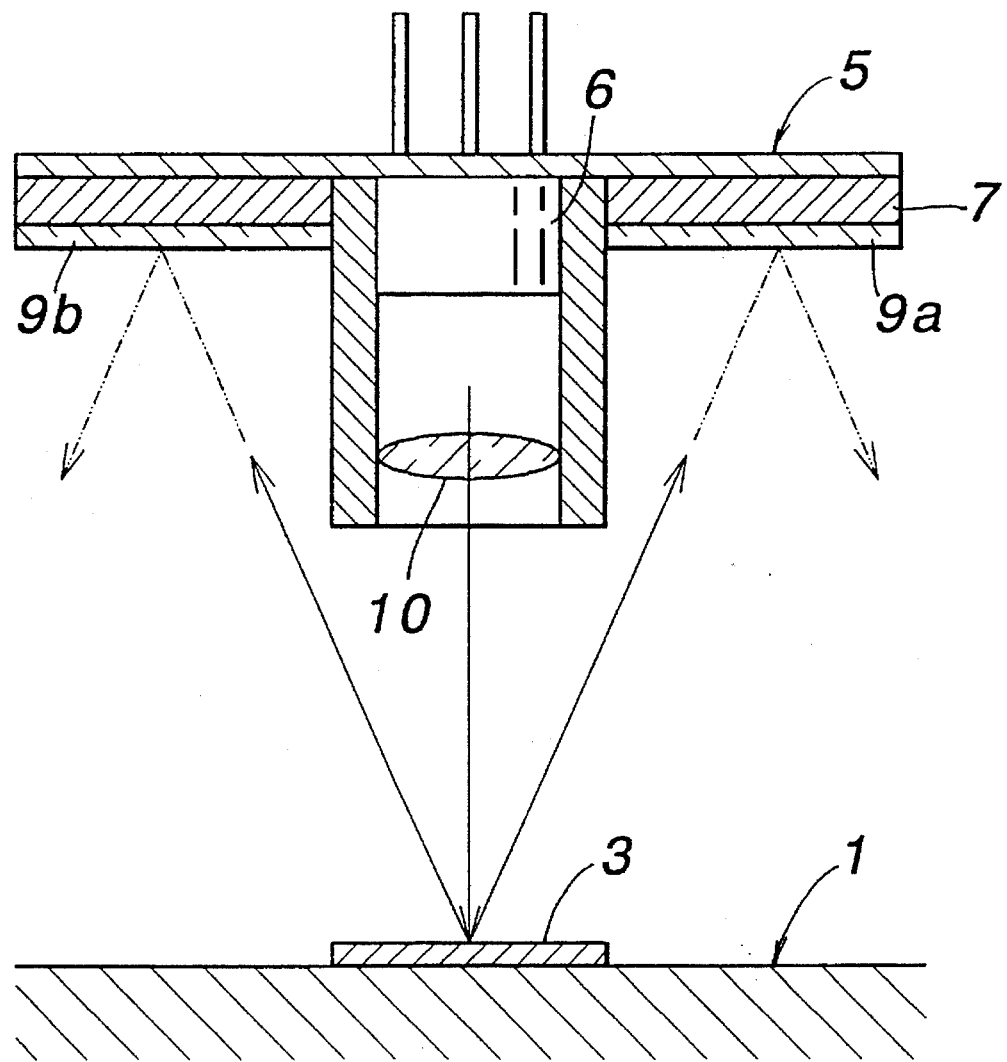
FIG. 3 is a sectional side view of the light emitting/receiving unit.

Further, as shown in FIGS. 2 and 3, the surfaces of the segments 7e through 7h are covered by a first filter 9a which transmits only the linearly polarized light having a prescribed direction of polarization while the surfaces of the segments 7a through 7d are covered by a second filter 9b which transmits only the linearly polarized light whose plane of polarization is rotated by 90 degrees from the mentioned prescribed direction. Thus, the segments 7e through 7h located on one side of an imaginary diametric line 14 passing through the center of the light receiving device 7 are covered by the first filter 9a while the segments 7a through 7d located on the other side of the diametric line 14 are covered by the second filter 9b. An object lens 10 is interposed between light emitting device 6 and the identification element 3.

Figure 4:
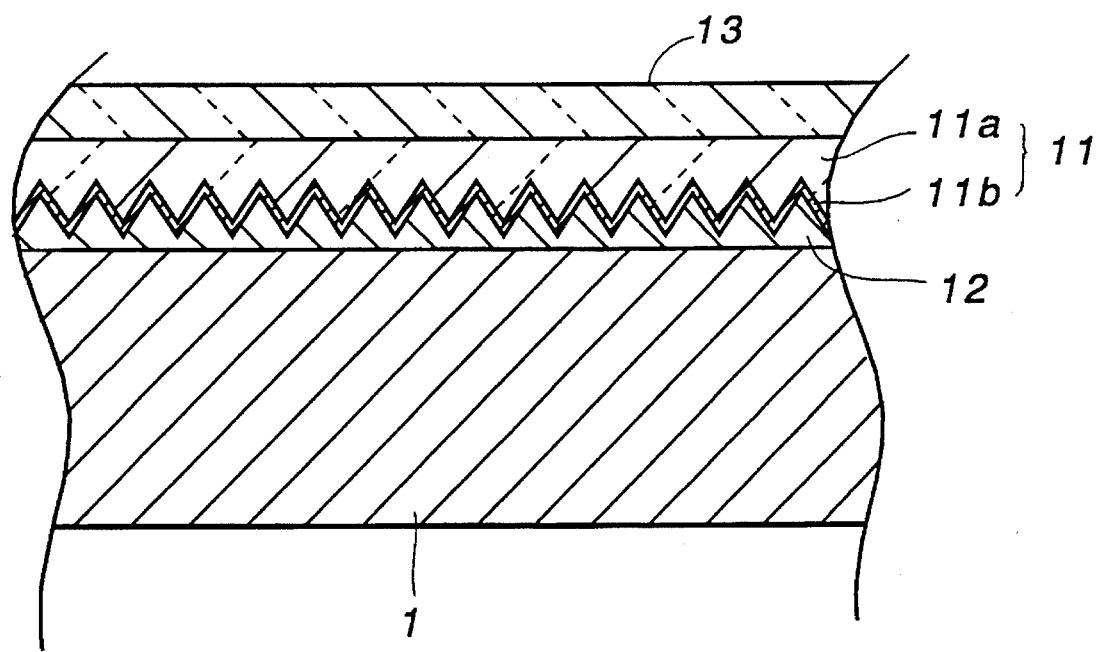
FIG. 4 is a sectional side view of the identification element.

With reference to FIG. 4, the identification element 3 comprises a hologram layer 11 consisting of a hologram forming layer 11a and an underlying reflective layer 11b, a bonding layer 12 bonding the hologram layer 11 to the surface 1a of the card 1, and a protective layer 13 covering the surface of the hologram layer 11. The material of the hologram forming layer 11a in this case consists of polyvinylchloride (PVC), which has a relatively pronounced double refractive property. The thickness of the hologram forming layer 11a is determined such that the double refraction achieved by the hologram forming layer 11a corresponds to one quarter of the wavelength of the laser light radiated from the light emitting device 6. Thus, the laser light impinged upon the identification element 3 passes through the 10 hologram forming layer 11a twice, and is therefore emitted from the hologram forming layer 11a in the direction determined by the diffractive property of the hologram as a linearly polarized light whose plane of polarization is rotated by 90 degrees or whose phase is shifted by 180 degrees.

Now the operation of this embodiment is described in the following. As illustrated in FIG. 3, when the card 1 is conveyed to a position where the identification element 3 and the light emitting/receiving unit 5 oppose each other, the light emitting device 6 emits detection light having a polarization direction of a prescribed direction which impinges upon the identification element 3. As a result, the light is subjected to double refraction by the hologram forming layer 11a. The light diffracted and reflected by the light reflecting layer 11b is projected upon a prescribed pair of diagonally opposing segments (segments 7a and 7e, segments 7b and 7f, segments 7c and 7g, and segments 7d and 7h) of the light receiving device 7 as a linearly polarized light whose plane of polarization is rotated by 90 degrees from that of the incident light according to the diffractive property of the hologram.

The segments 7e through 7h of the light receiving device 7 are covered by a first filter 9a which transmits only a linearly polarized light having a polarization plane of a prescribed direction while the segments 7a through 7d of the light receiving device 7 are covered by a second filter 9b which transmits only a linearly polarized light having a polarization plane which is rotated by 90 degrees from the prescribed direction. Thus, the light emitted from the identification element 3 is received only by one of the segments 7a through 7d. The determination unit 8 determines the ratio of the intensities of the light received by each pair of the segments symmetric with respect to the light emitting device 6, and by comparing each of the thus obtained ratios with a prescribed threshold value or by comparing the ratios with one another, the authenticity of the identification element 3 or the authenticity of the card 1 may be determined.

Figure 5:
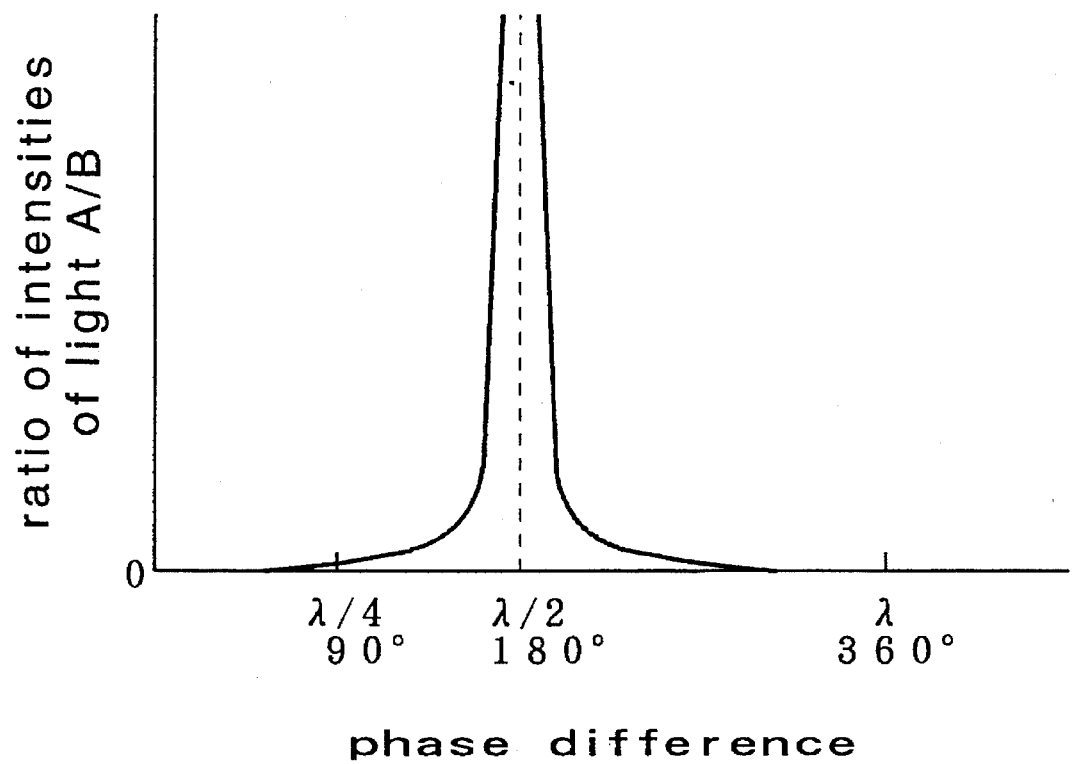
FIG. 5 is a graph showing the relationship between the phase shift and the output value (the ratio of the intensities of the light received by a diametrically opposing pair of light receiving segments.

When the diffraction light from the identification element 3 is radiated, for example, upon the segments 7a and 7e, the difference in the intensities of the light received by the segments 7a and 7e is maximized. In other words, the ratio of the intensities of the light received by the segments 7a and 7e is maximized as illustrated in FIG. 5. The lights received by the segments 7a and 7e have a polarization phase shift of 180 degrees between them or, in other words, there is a difference of 90 degrees between the polarization planes of these two lights, and the segments 7a and 7e each have a selective sensitivity to light of the corresponding angle of the polarization plane. The overall effect is that the light receiving element has a high selectivity toward the prescribed combination of the diffractive property and polarization plane rotating property of the identification element, and can positively and reliably identify the authenticity of the identification element without being interfered by noises.

The same result can be achieved, even if the hologram forming layer 11a is not made of material having any particularly pronounced property of double refraction, by providing a polarization plane rotating layer over the surface of the identification element for shifting the phase by the required amount. It is thus conceivable to provide a polarization plane rotating layer in the form of a sticker, and place it over the surface of the identification element for illicit purposes. However, if the diffractive property of the identification element 3 and the angle of rotation of the polarization plane achieved by the polarization plane rotating layer do not accurately match with each other, for instance, when diffraction light is directed upon the segments 7a and 7e, since it is necessary that the intensity of the light received by the segment 7e is high while that by the segment 7a is low, and it can be achieved only if the lights received by the segments 7a and 7e have polarization planes of prescribed angles which are 90 degrees apart or a shift difference of 180 degrees, it is readily possible to detect any forgery which involves some errors in the angles of the polarization planes from the corresponding segments of the light receiving device 7. Thus, such an attempt to forge an identification element can be readily detected, and is therefore successfully discouraged.

The hologram forming layer 11a of the present embodiment is made of a material having a pronounced property of double refraction, but a similar result can be obtained even when the protective layer 13, instead of the hologram forming layer 11a, is made of such a material. The material may consist of cellophane, polyvinyl alcohol (PVA), cellulose acetate, polycarbonate resin, and so forth, and can be processed so that the amount of double refraction may correspond to one quarter of the wavelength of the radiated light.

As can be understood from the above description, according to the system for identifying an object of the present invention, the object is provided with an identification element which reflects linearly polarized light of a prescribed wavelength into a plurality of point symmetric directions and includes a polarization plane rotating layer for rotating the linearly polarized light by 90 degrees. The light from the identification element is received by a prescribed pair of light receiving segments, one of each pair being provided with a first filter transmitting only the light whose plane of polarization is rotated by 90 degrees, while the other of each pair is provided with a second filter transmitting only the light whose plane of polarization is not rotated, so that the authenticity of the object may be determined from the ratio of the intensities of the light received by each pair of the light receiving segments. Since the amount of rotation of the polarization plane is determined by the thickness of the layer material, it is difficult to notice that the identification element is used for such a purpose, and the system of identification cannot be readily analyzed for illicit purposes. Furthermore, a normal output cannot be obtained if the polarization plane rotating layer is made of optically anisotropic material and the specific diffractive property or the reflective directivity of the identification element lacks a prescribed structure. Therefore, even if an attempt is made to duplicate the identification element including the polarization rotating plane for an illicit purpose, for instance by fabricating it as a sticker, as it is extremely difficult to achieve satisfactory accuracy in the structure of the polarization plane rotating layer, identification of the authenticity of the object can be ensured. Thus, the present invention is highly effective in discouraging the unauthorized duplication of the object.

Although the present invention has been described in terms of specific embodiments thereof, it is possible to modify and alter details thereof without departing from the spirit of the present invention.

What we claim is:

1. A system for identifying an object, comprising:
   an identification element comprising
      a reflective layer affixed to an object to be identified, said reflective layer having such a reflective directivity that when an incident light beam is impinged thereon the reflected light is directed at least in two directions which are 180 degrees apart around said incident light beam, and a polarization plane rotating layer placed on said reflective layer for rotating a polarization plane of light emitted from said reflective layer by 90 degrees relative to said incident light beam;

light emitting means for producing said incident light beam as a linearly polarized light beam;

light receiving means consisting of a plurality of pairs of light detecting segments arranged around said light emitting means, wherein each of said pairs of light detecting segments comprises a first segment and a second segment, said first segment and said second segment being positioned 180 degrees apart around said light emitting means;

a first filter placed on said first segment of each of said pairs of light detecting segments, said first filter having the property of transmitting substantially only the light emitted from said identification element whose plane of polarization is rotated by said polarization plane rotating layer;

a second filter placed on said second segment of each of said pairs of light detecting segments, said second filter having the property of transmitting substantially only the light emitted from said identification element whose plane of polarization is not rotated by said polarization plane rotating layer; and means for comparing intensities of light detected by said light detecting segments, and for determining the authenticity of said object according to a pattern of the intensities of light detected by said light detecting segments, wherein said means for comparing and for determining includes means for computing a ratio of the intensities of light received by said first segment and said second segment, respectively, in each of said pairs of light detecting segments, and for determining the authenticity of said object when said ratio is greater than a prescribed threshold level for a prescribed one of said pairs of light detecting segments.

2. A system for identifying an object according to claim 1, wherein said reflective layer comprises a hologram or a diffraction grating.

3. A system for identifying an object according to claim 1, wherein said object consists of an information storage card suitable for exchanging information via a reader/writer.

4. A system for identifying an object according to claim 1, wherein said determination means is provided with means for computing a difference in the intensities of light received by said first segment and said second segment, respectively, in each of said pairs of light detecting segments, and determining an authenticity of said object when said difference is greater than a prescribed threshold level for a prescribed one of said pairs of light detecting segments.

5. A system for identifying an object according to claim 1, wherein said pairs of light detecting segments are arranged around said incident light beam in an annular fashion, and said first filter is placed on those of said light detecting segments located on a first side of a diametric line separating said light detecting segments into two equal parts while said second filter is placed on those of said light detecting segments located on a second side of said diametric line.

6. A system for identifying an object according to claim 1, wherein said polarization plane rotating layer consists of a hologram or diffraction grating forming layer having a hologram or a diffraction grating formed on a lower surface thereof, and provided with a property of double refraction that is required for rotating the polarization plane by 90 degrees.

7. A system for identifying an object according to claim 1, wherein said polarization plane rotating layer consists of a protective layer placed on said reflective layer.

* * * * *